A. R. MORRILL.
MACHINE FOR PREPARING WELTING.
APPLICATION FILED JAN. 25, 1915.

1,204,897.

Patented Nov. 14, 1916.
4 SHEETS—SHEET 1.

Witnesses,
N. D. McPhail
M. A. Hurley.

Inventor,
Alfred R. Morrill
by his Attorneys
Phillips, Van Everen & Fish

A. R. MORRILL.
MACHINE FOR PREPARING WELTING.
APPLICATION FILED JAN. 25, 1915.
1,204,897.
Patented Nov. 14, 1916.
4 SHEETS—SHEET 2.
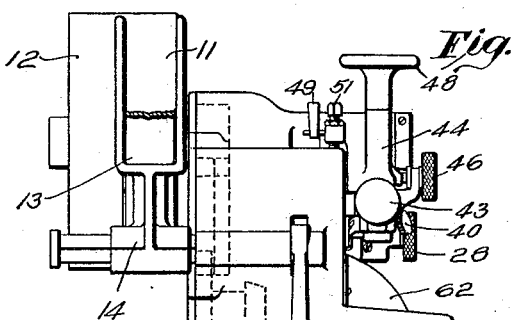
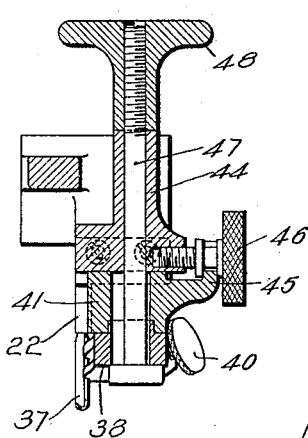
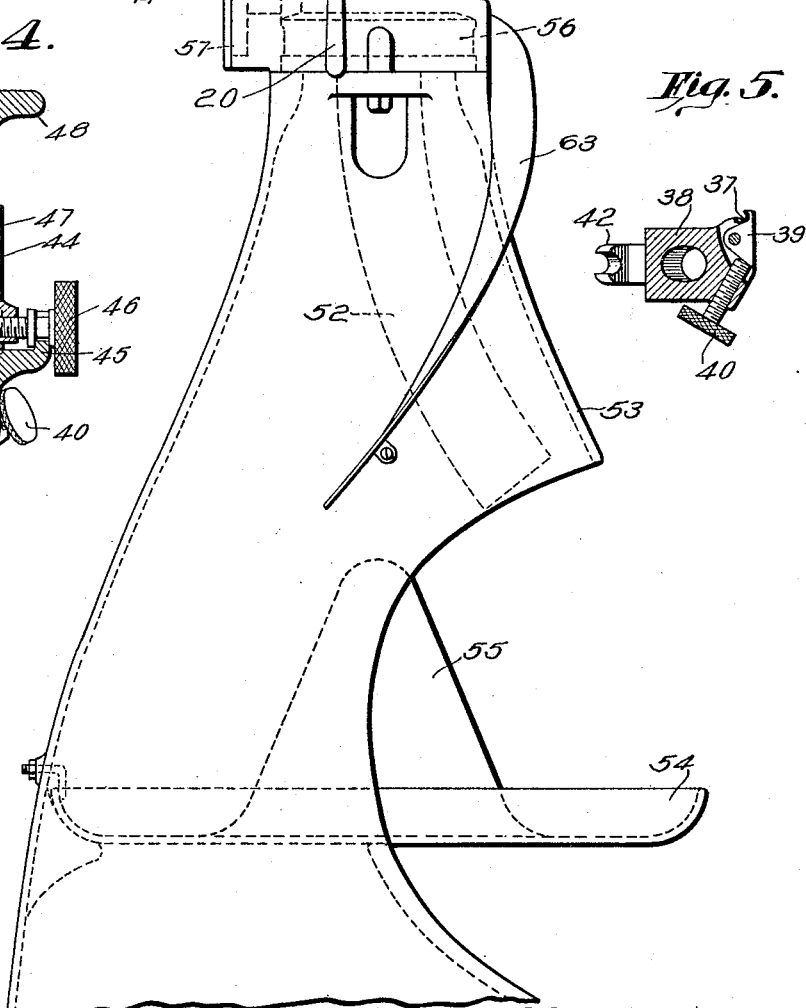
Witnesses,
N. D. McPhail
M. A. Hurley
Inventor;
Alfred R. Morrill
by his Attorneys
Phillips Van Everen & Fish

A. R. MORRILL.
MACHINE FOR PREPARING WELTING.
APPLICATION FILED JAN. 25, 1915.

1,204,897.

Patented Nov. 14, 1916.
4 SHEETS—SHEET 3.

Witnesses,
K. D. McPhail
M. A. Hurley

Inventor,
Alfred R. Morrill
by his Attorneys
Phillips Van Everen & Fish

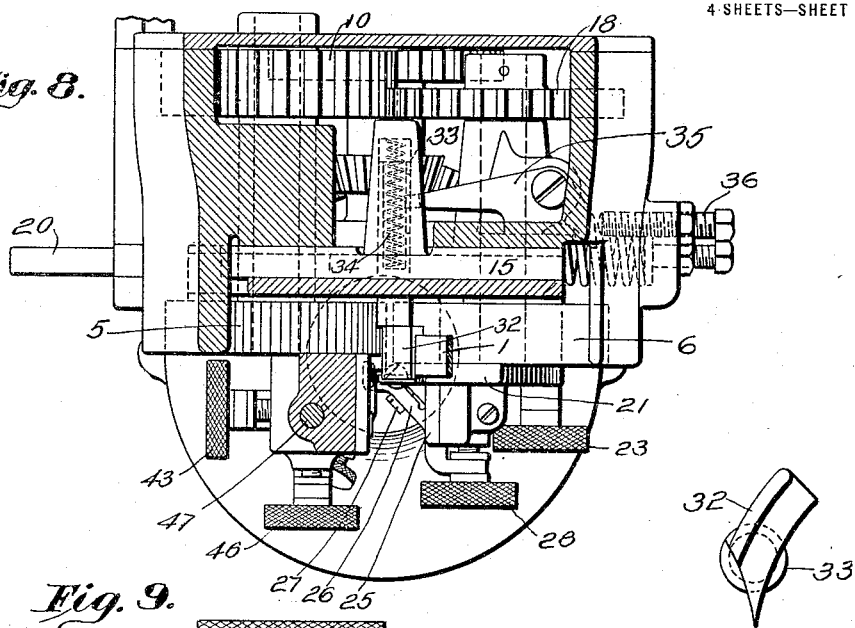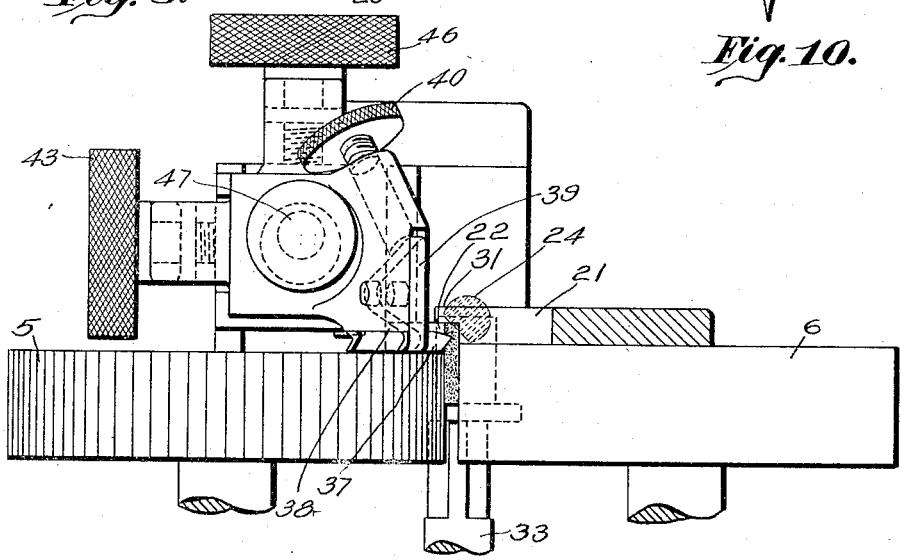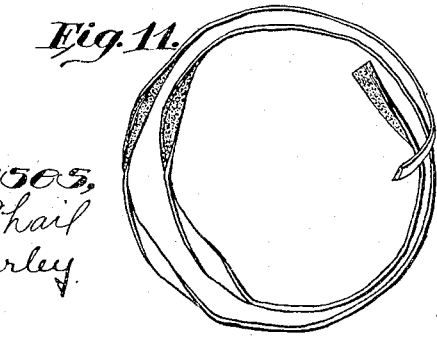

UNITED STATES PATENT OFFICE.

ALFRED R. MORRILL, OF BEVERLY, MASSACHUSETTS, ASSIGNOR TO UNITED SHOE MACHINERY COMPANY, OF PATERSON, NEW JERSEY, A CORPORATION OF NEW JERSEY.

MACHINE FOR PREPARING WELTING.

1,204,897.

Specification of Letters Patent.

Patented Nov. 14, 1916.

Application filed January 25, 1915. Serial No. 4,264.

*To all whom it may concern:*

Be it known that I, ALFRED R. MORRILL, a citizen of the United States, residing at Beverly, in the county of Essex and State of Massachusetts, have invented certain new and useful Improvements in Machines for Preparing Welting; and I do hereby declare the following to be a full, clear, and exact description of the invention, such as will enable others skilled in the art to which it appertains to make and use the same.

The present invention is designed primarily to facilitate the preparation of that form of welting which is used in the manufacture of Goodyear welt shoes, and the machine hereinafter described as the preferred embodiment of the invention is provided with improved means for grooving and beveling a leather strip to form such a welting, and with means for laying the grooved and beveled strip in a loose irregular coil or skein ready for the operator of the sewing machine by which the welt is incorporated in the shoe. It is to be understood, however, that certain features of the invention are not limited to use in the preparation of this particular kind of welting. It is also to be understood that except as defined in the claims certain features of the invention are not limited to use in a machine embodying any or all of the other features.

Figure 1:
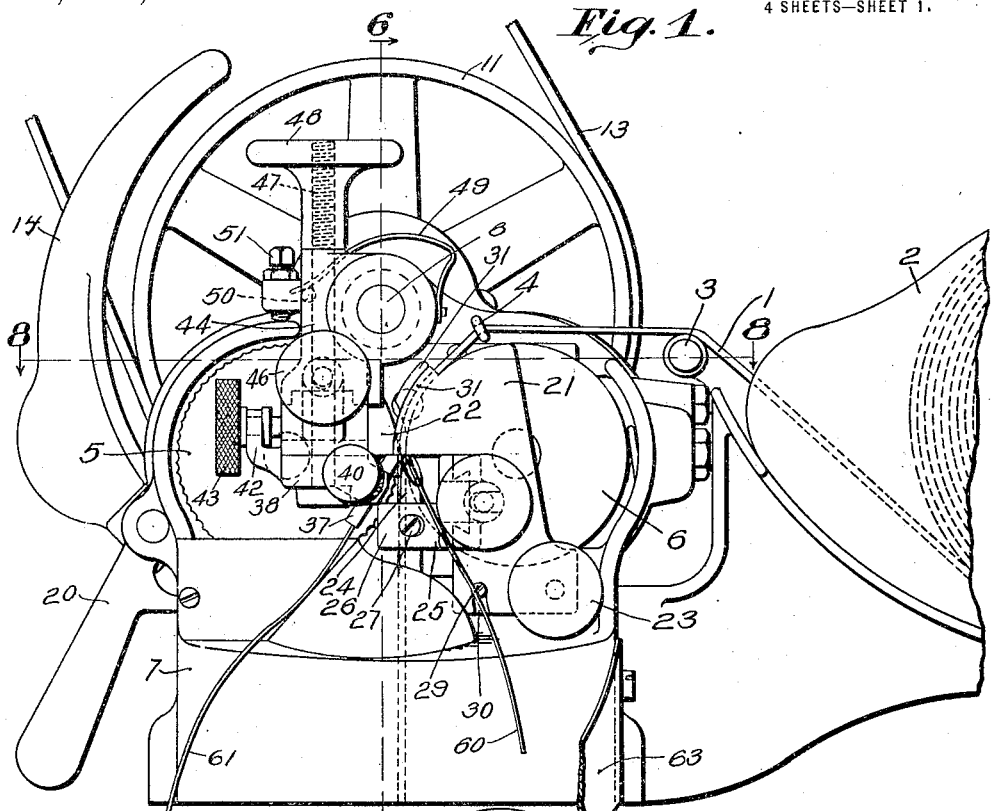
Figure 2:
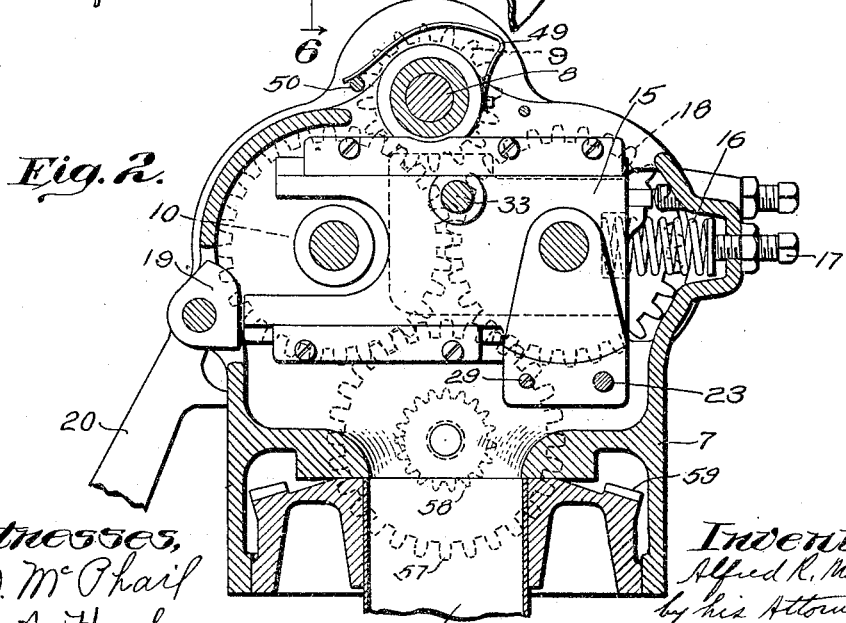
Figure 6:
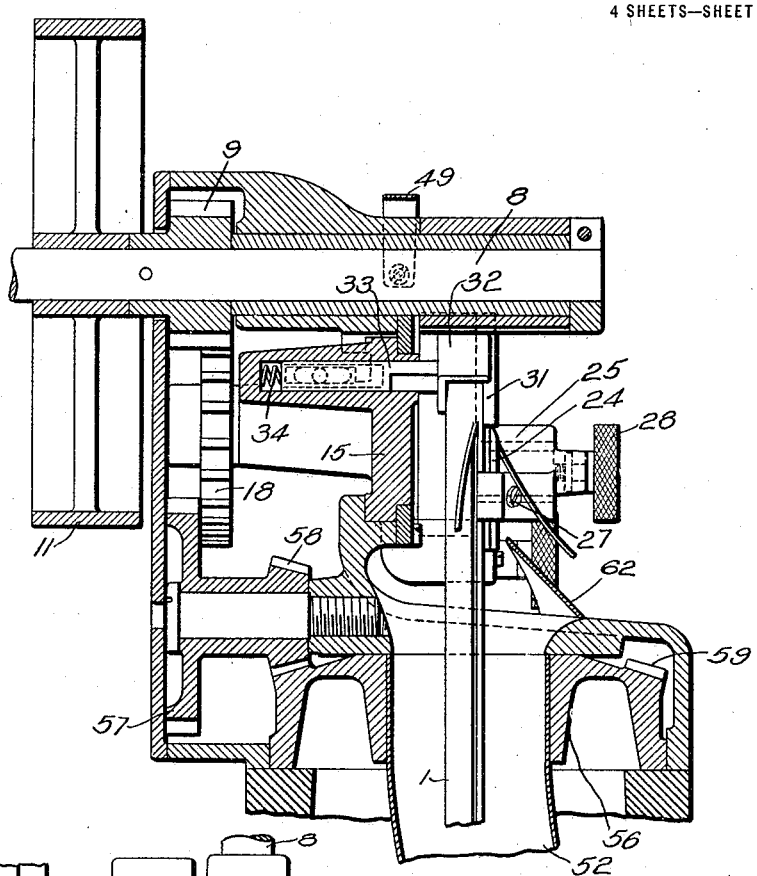
Figure 7:
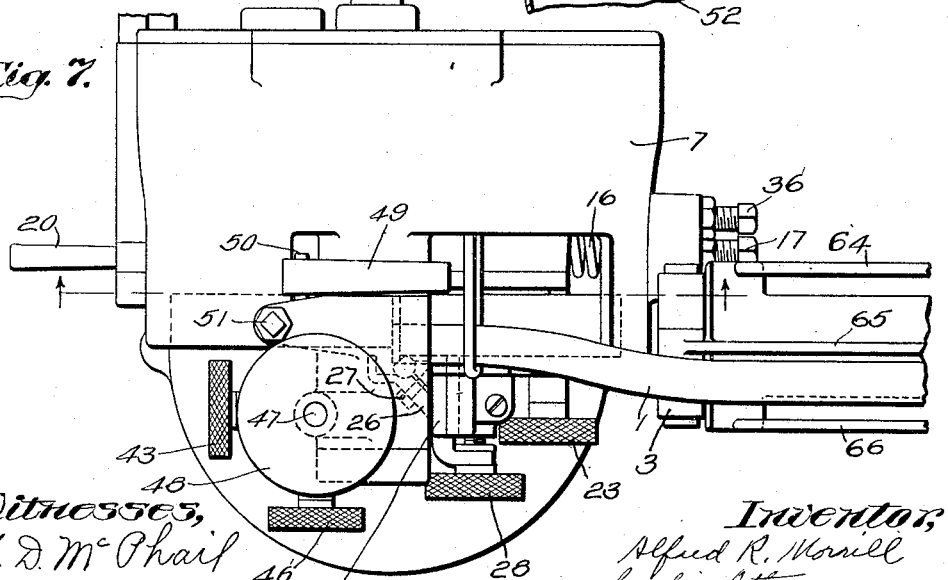

The constructions, combinations and arrangements of parts constituting the features of the present invention will be clearly understood and their advantages will be obvious to those skilled in the art from the following description when read in connection with the accompanying drawings in which, Figure 1 is a view in front elevation of the head of a welt grooving and beveling machine embodying the several features of the present invention in their preferred form; Fig. 2 is a vertical sectional view of the machine head illustrated in Fig. 1 taken on a plane just back of the welt feeding and supporting rolls; Fig. 3 is an end view of the complete machine; Fig. 4 is a detail sectional view of the grooving knife carrier illustrating the manner in which the grooving knife is mounted to permit adjustment toward and from the work and transversely of the feed of the work; Fig. 5 is a detail sectional view of the grooving knife block illustrating the manner in which the grooving knife is clamped to the block; Fig. 6 is a vertical central sectional view of the machine head taken on a plane indicated by the line 6—6 on Fig. 1; Fig. 7 is a plan view of the machine head; Fig. 8 is a sectional plan view taken on a plane indicated by the line 8—8 on Fig. 1; Fig. 9 is a detail inverted plan view illustrating the manner in which the welt strip is supported and acted upon by the grooving and beveling knives; Fig. 10 is a detail end view of the yielding edge gage for the welt strip; and Fig. 11 is a detail view indicating the appearance of the grooved and beveled welting as it is being formed into a loose, irregular coil with reverse twists.

As illustrated in the drawings, the leather strip 1 which is to be acted upon by the machine is supplied in the form of a closely wound coil which is received in a holder indicated at 2. From the holder 2 the strip leads over a guide 3 and through a closed guide 4 formed by a bent wire projecting from the head of the machine to the bite of the work supporting and feeding rolls 5 and 6. For convenience, the roll 5 may be termed a feeding roll and the roll 6 a coöperating work supporting roll. The roll 5 is mounted in fixed bearings in the head 7 of the machine and is continuously rotated while the machine is in operation from a driving shaft 8 through gears 9 and 10 mounted respectively on the driving shaft and on the shaft of the feed roll. Fast and loose pulleys 11 and 12 are mounted on the driving shaft 8 and a driving belt 13 is provided which can be shifted from one pulley to the other by means of a belt shipper 14.

The work supporting roll 6 which coöperates with the roll 5 to feed the strip is mounted in a horizontally movable carrier slide 15 which is acted upon by a coil spring 16 interposed between the carrier 15 and a plate carried at the inner end of an adjusting screw 17 in the frame 7 of the machine head. The tendency of this spring 16 is to force the carrier in a direction to cause the welt strip to be gripped between the rolls 5 and 6. The roll 6 is constantly driven during the operation of the machine by means of a gear 18 mounted on the rear end of the shaft of the roll and meshing with the gear 10 on the roll 5. To enable the rolls 5 and 6 to be separated for any purpose, as, for instance, to facilitate the introduction into the machine of the initial end of the leather strip 1 a cam 19 is mounted in the frame of the machine head in position to act upon the carrier 15 and is provided with a handle 20 by which it may be conveniently actuated by the machine operator. The arrangement of this cam with relation to the carrier is such, as best shown in Fig. 2, that an upward movement of the handle 20 will cause the cam to engage the carrier 15 and move the carrier against the force of the spring 16 in a direction to separate the roll 6 from the roll 5.

In the machine illustrated in the drawings, the welt grooving and beveling knives are arranged to act upon the welt strip substantially at the bite of the rolls 5 and 6 so that the strip is acted upon while under the control of the rolls, and the grooving and beveling operation is performed without bringing any longitudinal strain upon the strip tending to separate the strip at the point where one of the relatively short pieces used in forming the strip 1 is joined to another. The location of the grooving and beveling knives substantially at the bite of the rolls also enables the welt strip to be grooved and beveled uniformly throughout its entire length so that if a strip is delivered from the grooving and beveling knives no portion either at the beginning or end of the strip is left in an unprepared or imperfect condition. To permit the grooving and beveling knives to be located substantially at the bite of the rolls the means for guiding the welt strip to the rolls is arranged so that as the strip passes between the rolls one edge projects beyond the ends of the rolls. The relation of the welt strip to the rolls when passing between the rolls is clearly indicated in Fig. 9. As shown in this figure it will be noted that the work supporting roll 6 extends longitudinally beyond the roll 5 so that a portion of the edge of the welt strip which projects beyond the roll 5 is supported by the roll 6. As the welt strip passes between the rolls its projecting edge is supported on one side by a stationary work support 21 and on the other side by a presser foot 22 (see Figs. 1 and 9). The work support 21 is located at the front end of the roll 6 and is secured by means of a clamping screw 23 to a portion of the sliding carrier 15 which projects forwardly beneath the roll 6. The support 21 is provided with a strip supporting surface which is concentric with and forms a continuation of the surface of the roll 6. This strip supporting surface of the support 21 extends in the direction of the feed of the welt strip to the bite of the rolls 5 and 6 at which point the surface terminates so as to leave a space beyond the strip supporting surface to receive the beveling knife. The beveling knife can thus be supported at the end of the roll 6 with its cutting edge close to the end of the strip supporting surface of the support 21 so as to act on the welt strip substantially at the bite of the rolls 5 and 6, at which point the strip is firmly supported and held by the rolls and by the work support 21 and presser foot 22.

The welt beveling knife is indicated at 24. As shown, this knife consists of a cylindrical rod flattened on one side and provided at its upper end with a bevel face meeting the flattened side to form a cutting edge. This knife is secured to a knife block 25 by means of a split clamp 26 and clamping screw 27, as indicated in Figs. 1 and 7, the construction of the clamp being such as to permit an angular adjustment of the knife to vary the angle of bevel cut on the welt strip, and a vertical adjustment of the knife to bring the cutting edge into the desired position with relation to the work support 21. To enable the grooving knife 24 to be adjusted transversely of the direction of feed of the welt strip to produce the desired width of bevel the knife block 25 is mounted in a horizontal guideway in the support 21 and is engaged by an adjusting screw 28. To permit ready access to the beveling knife the support 21 which carries the beveling knife is pivotally supported on the clamping screw 23 so that the support, together with the beveling knife, can be swung to the right, as viewed in Fig. 1, so as to remove the beveling knife from its position at the bite of the rolls. A stop screw 29 engaging a slot 30 in the lower edge of the support 21 serves to position the support and beveling knife accurately when the support is swung back into operative position. It will be noted that the beveling knife is rigidly mounted with relation to the support 21 and that the support 21 during the operation of the machine is movable toward and from the stationary feeding roll 5 with the roll 6. During the operation of the machine, therefore, the edge of the beveling knife maintains its position with relation to the supporting surface of the support 21 and to the surface of the strip resting on the support so that a uniform bevel is cut on the welt strip regardless of any variations in the thickness or other irregularities in the welt strip.

As the welt strip passes over the roll 6 to the bite of the rolls 5 and 6 its position with relation to the rolls and to the grooving and beveling knives is controlled by a fixed and a yielding edge guide. The fixed guide for engaging one edge of the welt consists of a rib 31 projecting from the work support 21. The yielding guide which engages the other edge of the welt and coöperates with the fixed guide 31 is indicated at 32. This guide is shaped as best illustrated in Figs. 6 and 10 to engage the edge of the welt opposite the guide 31 and to extend over the welt. The portion which extends over the welt is curved so as to be concentric with the surface of the supporting roll 6 and the guide as a whole is so shaped that it extends well down between the rolls 5 and 6. To cause the guide 32 to be yieldingly pressed toward the guide 31 it is provided with a shank 33 which is received in a guideway formed in a projection on the carrier slide 15 for the roll 6. The shank 33 of the guide is hollow, as indicated in Figs. 6 and 8, to receive a coil spring 34, the tendency of which is to force the guide 32 toward the guide 31. In threading a new strip into the machine it is necessary or at least desirable to retract the edge guide 32 and to cause the guide to be retracted in a simple and convenient manner the machine illustrated in the drawings is provided with means for retracting the guide which is actuated by the movement of the carrier slide 15, which causes the separation of the rolls 5 and 6. The means for retracting the edge guide comprise a bell crank lever 35 pivotally mounted upon the carrier slide 15, as indicated in Fig. 8, and having one arm engaging a slot in the shank 33 of the guide 32 and having the other arm extending into a position to be engaged by a stationary stop screw 36 when the carrier 15 is actuated to separate the rolls 5 and 6.

The grooving knife is indicated at 37 and is mounted in the machine so as to operate on the portion of the welt which projects beyond the feeding roll 5 substantially at the bite of the rolls 5 and 6 and just beyond the point at which the projecting edge of the welt is engaged by the presser foot 22. The grooving knife consists of a blade bent as indicated in Figs. 4 and 9, which is secured to a knife block 38 by means of a pivoted clamp 39 actuated by a clamping screw 40, as best shown in Fig. 5. The clamp 39 permits an adjustment of the grooving knife in the direction of its length to bring its cutting edge into the desired position with relation to the presser foot 22. To enable the grooving knife to be adjusted toward and from the welt strip so as to vary the depth of the groove cut by the knife the block 38 is slidingly mounted upon an intermediate block 41 and is provided with an upturned ear 42 which is engaged by an adjusting screw 43 screwing into the intermediate block 41. To provide for an adjustment of the grooving knife transversely to the feed of the welt so as to locate the groove at the desired distance from the edge of the welt intermediate block 41 is slidingly mounted upon a carrier 44 and is provided with an upstanding lug 45 which is engaged by an adjusting screw 46 screwing into the carrier 44. To secure the knife block 38 and the intermediate block 41 in adjusted position a clamping bolt 47 is provided which passes downwardly through the carrier 44 and through slots in the blocks 38 and 41. The headed lower end of this bolt engages beneath the knife block 38 and its screw threaded upper end is engaged by a clamping nut 48. To the carrier 44 is also secured the presser foot 22 so that during the operation of the machine a fixed relation is maintained between the presser foot and the grooving knife, the depth of groove cut in the welt being regulated by the distance which the edge of the knife projects beyond the presser foot. A groove of uniform depth is thus cut in the welt strip throughout its length regardless of inequalities in the strip. To permit ready access to the grooving knife the carrier 44 is pivotally mounted upon the frame of the machine head so that the lower end of the carrier can be swung to the left, as viewed in Fig. 1, to remove the presser foot and grooving knife from their positions at the bite of the rolls. In the construction illustrated in the drawings the carrier 44 is pivotally mounted upon a bushing which surrounds the driving shaft 8. To hold the presser foot and grooving knife in operative position a leaf spring 49 is secured at one end to the frame of the machine head and at its other end is arranged to bear against a pin 50 projecting from the carrier 44. The shape of this spring 46 is such that when the lower end of the carrier is swung to the left, as viewed in Fig. 1, the pin 50 is disengaged from the operative portion of the spring 49 and the tendency of the spring to force the carrier toward the supporting roll 6 ceases. The movement of the carrier 44 toward the roll 6 under the action of the spring 49 is limited by an adjustable stop screw 51 arranged to engage a stationary part of the frame of the machine head.

The work supporting and feeding rolls 5 and 6 are so arranged that the welt strip as it leaves the rolls passes downward in a vertical direction. As the grooved and beveled strip passes downwardly it is received in a vertically arranged coiling guide 52. This guide, as shown, is in the form of a tube which extends downwardly within a hollow column 53 on the top of which the machine head frame 7 and the parts carried thereby are mounted. The guide 52, as it extends downwardly, bends outwardly, as best shown in Fig. 3, and the guide is of such size having a diameter considerably greater than the width of the welt strip, and is so arranged that the welt strip passes downwardly through the guide and is delivered from the lower end of the guide by the action of gravity. Means are provided in the machine for rotating the guide about a vertical axis substantially concentric with the upper end of the guide so that the lower end of the guide moves in a circular path. Below the lower end of the guide 52 a stationary support 54 is provided upon which the welt is laid in a coil as the guide 52 rotates. The welt strip is delivered to the upper end of the guide by the welt supporting and feeding rolls 5 and 6 and as the welt strip passes downwardly through the guide by the force of gravity it is delivered from the lower end at a speed depending upon the speed of the feed rolls. The mechanism for rotating the guide is arranged to rotate the guide at such a speed with relation to the speed at which the welt strip is delivered from the lower end of the guide as to cause the strip to be laid on the support 54 in the form of a loose irregular coil, a twist being placed in each turn of the coil as indicated in Fig. 11. The speed of rotation of the guide is such as compared with the speed at which the welt strip is delivered from the guide that no tension is placed upon the strip tending to injure the strip or to draw the turns of the coil into a tight formation. The turns of the coil are thus allowed to lie loosely upon each other and to become displaced somewhat with relation to each other by reason of the twists formed in each turn. To prevent an excessive displacement of any turn of the coil across the center of the coil so as to completely destroy the general coil formation, the support 54 is provided with a central projection 55, which when the coil is completed occupies the center of the coil. The support 54 is located in the hollow column 53 and the column is provided with a lateral opening through which the coil or skein of welting laid on the support 54 can be removed. The coil or skein of welting when removed from the support 54 is in condition for use by the inseam sewing machine operator inasmuch as the turns of the coil rest loosely upon and across each other more or less so that the welting can be readily moistened by immersion in water, and inasmuch as each turn of the coil or skein is provided with a twist so that when the welt strip is drawn out by the inseam sewing machine operator it will come to the machine in a straight, untwisted condition.

To enable the guide 52 to be rotated it is secured at its upper end in a rotatable carrier 56 which is driven from the gear 10 on the feed roll 5 through a gear 57 meshing with the gear 10, a bevel gear 58 formed on the hub of the gear 57, and a bevel gear 59 formed on the carrier 56 and meshing with the bevel gear 58. A portion of the frame of the machine head extends horizontally over the carrier 56, as best shown in Figs. 2 and 6, and this portion of the frame of the machine head is provided with a guiding opening corresponding in size to the upper end of the coiling guide 52. To prevent the waste strips removed by the grooving and beveling knives from entering the guide 52 and being coiled up with the grooved and beveled strip upon the support 54 the grooving and beveling knives are so arranged that these waste strips are directed outside of the guide and outside of the hollow column 53. In Fig. 1 the waste strip cut by the beveling knife is indicated at 60 and the waste strip cut by the grooving knife is indicated at 61. These strips are guided outside of the hollow column and prevented from entering the coiling guide by the horizontal portion of the machine head frame, above referred to, and by a guiding and covering casing 62 secured to the machine head frame and extending partially over the guiding opening through which the grooved and beveled strip passes into the coiling guide. After passing outside of the column the waste strips 60 and 61 are conducted down the column in the desired path by means of a curved guiding shelf 63 secured to the outside of the column.

As has been stated, the leather strips which are to be prepared for use as welting are supplied to the machine in the form of closely wound coils or rolls. To enable the machine operator to supply these closely wound coils or rolls to the machine to advantage and without loss of time a plurality of holders for the rolls are provided. As shown in the drawings, and particularly in Figs. 1 and 2, these holders consist of two troughs formed in the holder 2 in which the rolls to be acted upon by the machine are placed on edge. The troughs are formed by suitable bottom walls and by three vertical walls 64, 65 and 66. The vertical wall 65, as indicated in Fig. 7, is arranged substantially in line with the center of the welt strip as it passes into the bite of the rolls 5 and 6. By slightly deflecting the welt strip sidewise in one direction or the other a strip may be drawn from either of the troughs by the feed rolls of the machine.

By reason of the fact that the welt strip as it passes between the feed rolls is engaged near one edge by the work support, presser foot, grooving knife and beveling knife, the strip as it passes downwardly from the rolls has a tendency to bend laterally toward the front of the machine or toward the right, as viewed in Fig. 6. To correct this tendency and cause the strip to bear downwardly in a substantially straight line, one of the members of the clamp 26 for the beveling knife is extended, as indicated in Figs. 7 and 8, to form a guide for the edge of the strip which has been acted upon by the grooving and beveling knives.

The operation of the machine illustrated in the drawings has been indicated in connection with the description of the construction and arrangement of the various parts and will be readily understood without further explanation.

The nature and scope of the present invention having been indicated and a machine embodying the several features of the invention in their preferred form having been specifically described, what is claimed is:—

1. A machine for preparing welting, having in combination, a feed roll mounted in fixed bearings, a coöperating work supporting roll, a carrier for the work supporting roll movable toward and from the feed roll, and a beveling knife mounted on the carrier.

2. A machine for preparing welting, having in combination, a feed roll mounted in fixed bearings, a coöperating work supporting roll, a carrier for the work supporting roll movable toward and from the feed roll, a beveling knife mounted on the carrier, and manually operated means for moving the carrier to separate the rolls.

3. A machine for preparing welting, having in combination, a feed roll mounted in fixed bearings, a coöperating work supporting roll, a carrier for the work supporting roll movable toward and from the feed roll, a beveling knife mounted on the carrier, manually operated means for moving the carrier to separate the rolls, an edge guide for the welt strip, and means operated by the movement of the carrier for retracting the edge guide.

4. A machine for preparing welting, having in combination, a feed roll mounted in fixed bearings, a coöperating work supporting roll, a carrier for the work supporting roll movable toward and from the feed roll, a beveling knife mounted on the carrier, manually operated means for moving the carrier to separate the rolls, an edge guide for the welt strip yieldingly mounted on the carrier, and means operated by the movement of the carrier for retracting the edge guide.

5. A machine for preparing welting, having in combination, a feed roll mounted in fixed bearings, a coöperating work supporting roll, a carrier for the work supporting roll movable toward and from the feed roll, a beveling knife mounted on the carrier, a presser foot, a presser foot carrier movable toward and from the supporting roll, and a grooving knife movable with the presser foot carrier.

6. A machine for preparing welting, having in combination, a feed roll, a coöperating work supporting roll, means for guiding a welt strip with one edge projecting beyond the end of the work supporting roll, a work support for the projecting edge of the welt located on the same side of the welt as the coöperating roll, and having a welt supporting surface concentric with the roll surface, and a beveling knife arranged to act on the welt beyond the work support.

7. A machine for preparing welting, having in combination, a feed roll, a coöperating work supporting roll, means for guiding a welt strip with one edge projecting beyond the end of the work supporting roll, a work support for the projecting edge of the welt located on the same side of the welt as the coöperating roll and having a welt supporting surface concentric with the roll surface, a beveling knife arranged to act on the welt beyond the work support, an edge guide on the work support for one edge of the welt, and a yielding edge guide coöperating therewith for the other edge of the welt.

8. A machine for preparing welting, having in combination, a feed roll, a coöperating work supporting roll, means for guiding a welt strip with one edge projecting beyond the end of the work supporting roll, a work support for the projecting edge of the welt located on the same side of the welt as the coöperating roll and having a welt supporting surface concentric with the roll surface, and a beveling knife mounted on the work support to act on the welt beyond the work support, said work support being pivotally mounted to be swung out of operative position to permit access to the knife.

9. A machine for preparing welting, having in combination, a feed roll mounted in fixed bearings, a coöperating work supporting roll, a carrier for the work supporting roll movable toward and from the feed roll, means for guiding a welt strip with one edge projecting beyond the end of the work supporting roll, a work support for the projecting edge of the welt strip mounted on the carrier, and a beveling knife movable with the carrier arranged to act on the welt beyond the work support.

10. A machine for preparing welting, having in combination, a feed roll, a yieldingly mounted coöperating work supporting roll, means for feeding a welt strip with one edge projecting beyond the end of the feed roll, a presser foot on the same side of the welt strip as the feed roll and arranged to bear on the projecting edge of the strip, a yieldingly mounted carrier for the presser foot, and a grooving knife mounted on the carrier.

11. A machine for preparing welting, having in combination, means for supporting and guiding a welt strip, a grooving knife, a slotted knife block to which the grooving knife is secured, an intermediate slotted block on which the knife block is adjustably mounted, a carrier upon which the intermediate block is adjustably mounted, and a bolt passing through the slots in both blocks to secure the blocks in adjusted position on the carrier.

12. A machine for preparing welting, having in combination, means for supporting and guiding a welt strip, a pivotally mounted carrier, a presser foot and a grooving knife on the carrier, and a spring tending to hold the presser foot and knife against the work when the carrier is in operative position and ceasing such tendency when the carrier is swung out of operative position to permit access to the knife.

13. A machine for preparing welting, having in combination, welt grooving and beveling knives, means for supporting a welt strip and for feeding the strip past the knives, a coiling guide to receive the grooved and beveled strip, and means for rotating the guide to cause the strip to be laid in a loose irregular coil with twists corresponding in number to the turns of the coil.

14. A machine for preparing welting, having in combination, means for supporting and feeding a welt strip, a coiling guide to receive the strip, means for rotating the guide to cause the strip to be laid in a loose irregular coil with twists corresponding in number to the turns of the coil, and a stationary support to receive the coil.

15. A machine for preparing welting, having in combination, means for supporting and feeding a welt strip, a coiling guide to receive the strip, means for rotating the guide to cause the strip to be laid in a loose irregular coil with twists corresponding in number to the turns of the coil, and a stationary support to receive the coil having a projection to prevent displacement of the strip across the center of the coil.

16. A machine for preparing welting, having in combination, welt grooving and beveling knives, means for supporting a welt strip and for feeding the strip past the knives, a coiling guide to receive the grooved and beveled strip, means for directing the waste strips cut by the grooving and beveling knives outside of the guide, and means for rotating the guide to cause the strip to be laid in a loose irregular coil with twists corresponding in number to the turns of the coil.

17. A machine for preparing welting, having in combination, a hollow column, welt feeding mechanism mounted on top of the column, a coiling guide to receive the strip extending downwardly inside of the column, and means for rotating the guide to cause the strip to be laid in a loose irregular coil with twists corresponding in number to the turns of the coil.

18. A machine for preparing welting, having in combination, a hollow column provided with an opening in its side, welt feeding mechanism mounted on top of the column, a coiling guide to receive the strip of welting extending downwardly inside of the column, means for rotating the guide to cause the strip to be laid in a loose irregular coil with twists corresponding in number to the turns of the coil, and a support arranged to receive the coil and permit removal of the coil through said opening.

19. A machine for preparing welting, having in combination, a hollow column, mechanism for operating upon a welt strip mounted upon the column and comprising grooving and beveling knives and means for feeding a welt strip past the knives, a coiling guide to receive the grooved and beveled strip extending downwardly inside of the column, means for directing the waste strips cut by the grooving and beveling knives outside of the column, and means for rotating the guide to cause the strip to be laid in a loose irregular coil with twists corresponding in number to the turns of the coil.

20. A machine for preparing welting, having in combination, means for feeding a welt strip, a guide to receive the welt strip of greater diameter than the width of the strip and arranged to permit the passage of the welt strip therethrough by the action of gravity, means for rotating the guide to cause the strip to be laid in a loose irregular coil with twists corresponding in number to the turns of the coil, and a stationary support to receive the coil.

ALFRED R. MORRILL.

Witnesses:
CHESTER E. ROGERS,
E. MARION BLACK.

Copies of this patent may be obtained for five cents each, by addressing the "Commissioner of Patents, Washington, D. C."

It is hereby certified that in Letters Patent No. 1,204,897, granted November 14, 1916, upon the application of Alfred R. Morrill, of Beverly, Massachusetts, for an improvement in "Machines for Preparing Welting," an error appears in the printed specification requiring correction as follows: Page 5, lines 38–39, claim 3, for the words "an edge guide guide" read *a yielding edge guide;* and that the said Letters Patent should be read with this correction therein that the same may conform to the record of the case in the Patent Office.

Signed and sealed this 19th day of December, A. D., 1916.

[SEAL.]
R. F. WHITEHEAD,
*Acting Commissioner of Patents.*